2 Sheets--Sheet 1.

J. H. SHROTE, dec'd.

MARY SHROTE, Adm'x.

Machines for Sheeting Dough.

No. 5,794. Reissued March 17, 1874.

Attest:

W. T. Sunstrom

R. M. Sunstrom

Inventor.

Mary Shrote

Administratrix

AM. PHOTO-LITHOGRAPHIC Co. N. Y. (OSBORNE'S PROCESS.)

2 Sheets--Sheet 2.

J. H. SHROTE, dec'd.
MARY SHROTE, Adm'x.

Machines for Sheeting Dough.

No. 5,794. Reissued March 17, 1874.

Attest.

W. T. Sunstrom
R. M. Sunstrom

Inventor.

Mary Shrote
administratrix

AM. PHOTO-LITHOGRAPHIC Co. N. Y. (OSBORNE'S PROCESS.)

UNITED STATES PATENT OFFICE.

MARY SHROTE, OF BALTIMORE, MARYLAND, ADMINISTRATRIX OF JOHN H. SHROTE, DECEASED.

IMPROVEMENT IN MACHINES FOR SHEETING DOUGH.

Specification forming part of Letters Patent No. 117,474, dated July 25, 1871; reissue No. 5,794, dated March 17, 1874; application filed January 8, 1874.

*To all whom it may concern:*

Be it known that JOHN H. SHROTE, deceased, late of Baltimore, in the county of Baltimore and State of Maryland, invented a new and Improved Machine for Sheeting Dough; and I do hereby declare the following to be a full, clear, and exact description of the same, reference being had to the accompanying drawing, making a part of this specification, in which—

Figure 1:
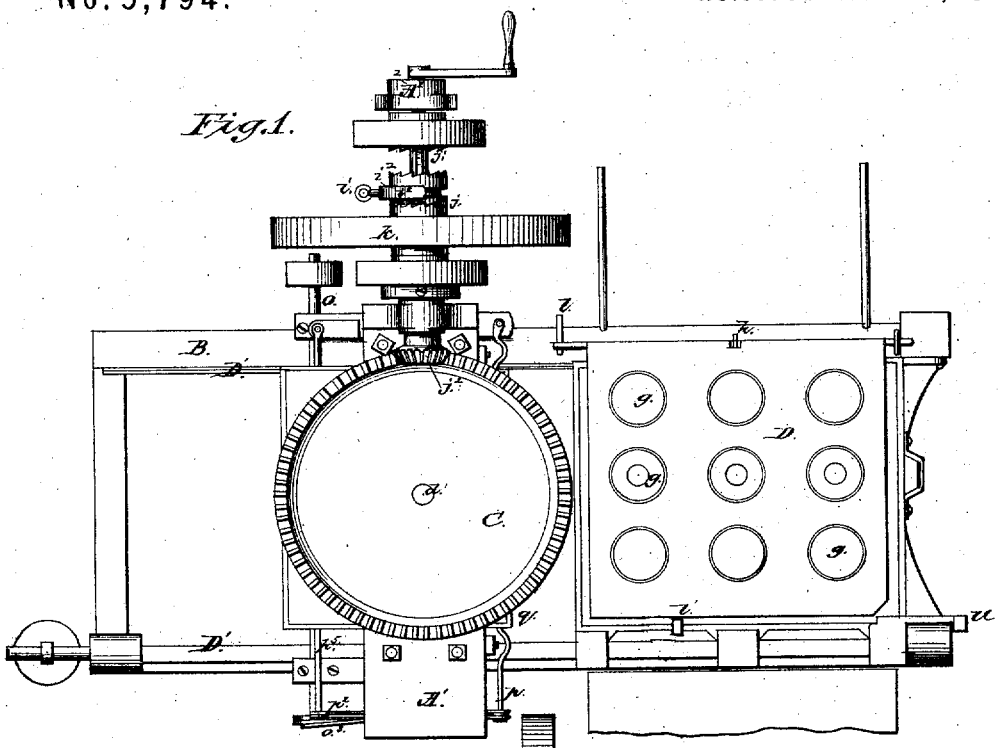
Figure 5:
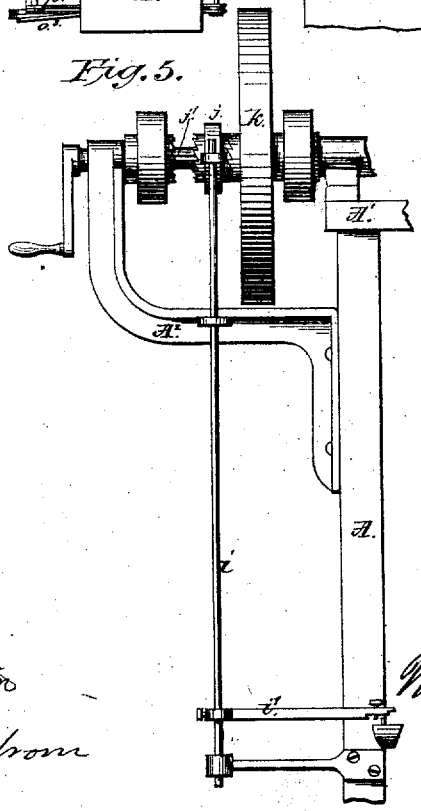
Figure 2:
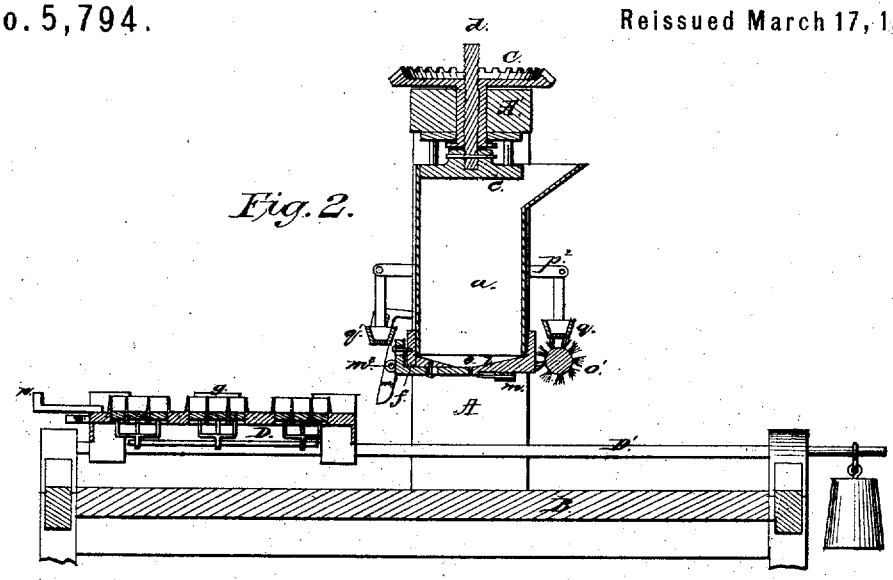
Figure 4:
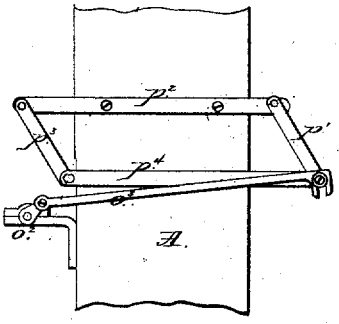
Figure 3:
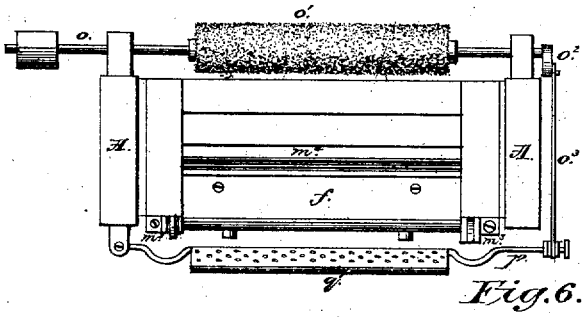
Figure 6:
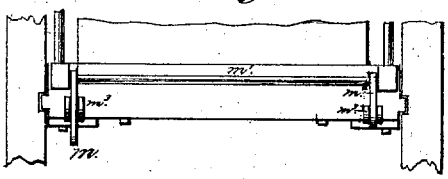

Figure 1 is a top view, Fig. 2 a longitudinal sectional elevation, Fig. 3 a bottom view, of the dough-receiver; Fig. 4, a detached elevation of the mechanism for working the sieves; Fig. 5, a detached elevation of the mechanism for throwing the clutch into gear with the band-wheel, or out of gear with it; and Fig. 6 is a detached elevation of the mechanism for operating the knife.

This invention relates to a machine for forcing dough, when placed in a mass in a receiver, out through a longitudinal slot in the bottom thereof in the form of a sheet, by pressure applied from a follower to the dough in the receiver, the forming of dough into sheets by pressure being the main idea of this invention.

Referring to the drawing, *a* is the receiver aforesaid, the same being an oblong box without top or bottom, set in a recessed horizontal plate, *b*, that is supported at its ends in standards A A, which spring from the sides of a frame, B. C is the follower, the same being secured to the lower end of a threaded stem, *d*, which passes upward through the cross-bar $A^1$, connecting the tops of the standards A. The stem *d* also passes through a tapped hole at the center of a bevel-gear, C, that rests on the cross-bar $A^1$. The longitudinal slot *e* is made in the plate *b*, so that, as the follower descends, it forces a sheet of dough out through the slot.

If a corrugated or serrated bar be set at the side of the slot, the sheet of dough will be furrowed or fluted accordingly.

An angle-bar, *f*, is attached to the front side of the plate *b* by screws, and extends under the plate *b* far enough to cover the slot *e*. Hence, by means of its attaching-screws, the angle *f* can be adjusted so as to practically vary the width of the slot *e*, or to close it altogether, thus regulating the thickness of the sheet. Beneath the plate *b*, between the standards A and above the frame B, are located parallel horizontal rails D′, on which slides a carriage, D, to the top of which is secured a number of annular cake-cutters, *g*. To one side of the carriage D a projection, *h*, is affixed, which, when the carriage has nearly reached the rear end of its throw, strikes the inner end of an arm, $i^1$, that extends from a vertical rock-shaft, *i*, which is mounted in suitable supports on one side of the adjacent standard A. A forked arm, $i^2$, projecting from the upper end of the shaft *i*, embraces a clutch, *j*, that slides on the horizontal shaft $j^1$, one of whose bearings is on the cross-bar A′, and the other in an arm, $A^2$, that extends from the adjacent standard A. The striking of the projection *h* aforesaid against the arm *i* throws the clutch *j* into gear with a band-wheel, *k*, to which power is communicated *aliunde*. The wheel *k* thereupon begins to turn the shaft $j^1$, a gear, $j^2$, on the inner end of which, engaging with the wheel C, rotates the latter. The wheel C screws the stem *d* downward; stem *d* carries the follower C, and the follower causes a sheet of dough to pass through the slot *e*. The carriage D should then be drawn forward, this carriage being moved in both directions by hand. As the carriage passes under the plate *b* it receives the sheet, the latter spreading itself flat upon the tops of the cutter *g*. A little before the rear end of the carriage passes under the plate *b* a hook, *l*, attached to the carriage, strikes the arm *i*, and throws the clutch *j* out of gear with the wheel *k*, thus stopping the follower. Just as the end of the carriage passes under the slot *e*, a projection, $l^1$, attached to the carriage, strikes the lower end of the lever *m*, which projects downward from a horizontal shaft, $m^1$, mounted in boxes attached to the front of the plate *b*. The lever *m* and a similar lever, $m^2$, projecting downward from the opposite end of the shaft $m^1$, are both jointed to the outer ends of arms $m^3$, which are attached to the extremities of a knife, $m^4$, placed beneath the plate *b*. The arms $m^3$ slide in ways made for them crosswise of the plate *b*.

The striking of the projection $l^1$ aforesaid against the lever $m$ causes the knife $m^4$ to be drawn forward, so as to sever the sheet of dough at the slot $e$. The sheet lying on the carriage is thus rendered independent, and is ready to be cut into cakes and turned over into the bake-pans by means described in his patent dated October 11, 1859. This having been done, the carriage is run back again; the projection $h$ throws the clutch $j$ into gear with the wheel $k$, as before; and a hook, $n$, attached to the front of the carriage, striking the lever $m$, throws the knife $m^4$ backward from the slot $e$.

A shaft, O, mounted horizontally on the back sides of the standards A, and connected by a band with the shaft $j^1$, bears a rotary brush, $O^1$. To a crank, $O^2$, on the end of the shaft O, is jointed a pitman, $O^3$, whose other extremity is connected with the end of a rod, $p$, the other end of which is pivoted to a lug extending forward from one end of the standards A. The extremity of the rod $p$ to which the pitman $O^3$ is attached is separated by a link, $p^1$, suspended from a horizontal bar, $p^2$, that is fastened to the outside of one of the standards A. A similar link, $p^3$, is suspended to the other end of the bar $p^2$, and the lower extremities of the links $p^1$ $p^3$ are connected by a bar, $p^4$, placed parallel to the bar $p^2$. The link $p^3$ supports the out end of a rod, $p^5$, whose other extremity is pivoted to a lug extending backward from the opposite side of the same standards A to which the lug of the rod $p$ is attached. The rods $p$ $p^5$ bear sieves $q$ $q'$, the former situated directly over the brush $O^3$, links $p^1$ $p^3$, and connecting-bar $p^4$.

The sieve $q$ sifts flour upon the brush $O^1$, and the brush throws the flour under the plate $b$, and upon that surface of the sheet of dough which is laid directly upon the cutters $g$. The sieve $q'$ sifts flour upon that side of the sheet which is uppermost on the carriage D. The object of sifting the flour upon the sheet is to prevent the dough from sticking to the cutters and pans. When the carriage dumps the sheet into the baker, that side which was beneath while on the carriage becomes uppermost in the baker.

Having thus described this invention, what I claim as new, and desire to secure by Letters Patent, is—

1. A vessel having a slotted opening for forming and discharging dough in sheets by pressure applied in the vessel, constructed as shown, and for the purposes described.

2. The bar $f$, arranged as described, in combination with the plate $b$, and adjustable thereto for varying the width of the slot, and thereby regulating and controlling the thickness of the sheet discharged, as set forth.

3. The combination of the receiver A, follower C, and plate $b$, provided with a slot, $e$, as shown and described, whereby the dough is pressed out into sheets.

4. The brush $O^1$ on the shaft O, in combination with the sieve $q$, for dusting the sheet of dough, as and for the purpose specified.

5. The combination of the knife $m^4$, arms $m^3$, rod $m^1$, and levers $m$ $m^2$ with the carriage, as set forth.

6. The combination of the arms $i$ $i^2$, rock-shaft $i$, and clutch $j$ with the carriage, as explained.

7. The sieves $q$ $q'$, shaft O, pitman $O^3$, rods $p$ $p^5$, connecting-bar $p^4$, combined, as and for the purpose specified.

MARY SHROTE,
*Administratrix.*

Witnesses:
M. T. SUNSTROM,
R. M. SUNSTROM.